United States Patent
Eriksen et al.

[11] Patent Number: 5,441,397
[45] Date of Patent: Aug. 15, 1995

[54] MOLD ARRANGEMENT FOR OPTODEVICES

[75] Inventors: Paul Eriksen, Tyresö; Jan-Ake Engstrand, Trångsund; Hans-Christer Moll, Enskede; Mikael Persson, Ahus; Jan-Agne Svensson, Degeberga, all of Sweden

[73] Assignee: Telefonaktiebolaget LM Ericsson, Stockholm, Sweden

[21] Appl. No.: 251,187

[22] Filed: May 31, 1994

[30] Foreign Application Priority Data

Jun. 1, 1993 [SE] Sweden .................. 9301858

[51] Int. Cl.⁶ .................................... B29C 45/14
[52] U.S. Cl. .................................... 425/116; 249/91; 249/95; 249/97; 264/1.25; 264/1.28; 225/123
[58] Field of Search .............. 425/116, 123; 264/1.24, 264/1.25, 1.28; 249/95, 96, 97, 91

[56] References Cited

U.S. PATENT DOCUMENTS

| | | | |
|---|---|---|---|
| 4,244,681 | 1/1981 | Comerford et al. | 425/123 |
| 4,662,962 | 5/1987 | Malavieille | 264/1.25 |
| 4,701,117 | 10/1987 | Takaoka et al. | 425/116 |
| 5,255,336 | 10/1993 | Kuder et al. | 264/1.25 |
| 5,265,184 | 11/1993 | Lebby et al. | 264/1.25 |
| 5,275,765 | 1/1994 | Go et al. | 264/1.25 |
| 5,308,555 | 5/1994 | Blyler, Jr. et al. | 264/1.25 |
| 5,311,604 | 5/1994 | Rogner et al. | 264/1.25 |

FOREIGN PATENT DOCUMENTS

WO87/02147 4/1987 WIPO .

Primary Examiner—Khanh P. Nguyen
Attorney, Agent, or Firm—Burns, Doane, Swecker & Mathis

[57] ABSTRACT

A mold arrangement for molding an optodevice onto an optical fibre ribbon. The mould includes several plates which are intended for insertion between the movable top plate and the stationary bottom plate, or counter-pressure plate, of a transfer molding press, and includes an inlet channel, primary and secondary runners, and an optodevice molding cavity which is defined by two of the plates, the mould plates, when the mould is closed, and through which the fibre ribbon extends. Each of the mould plates is provided with respective front and back exchangeable jaws. One jaw of the front jaws is provided in the jaw dividing plane with V-grooves which correspond in number to the number of fibers in the fibre ribbon and in which the optical fibers from which a protective covering material has been stripped are positioned so that their centers lie in the jaw dividing plane. That side of the other jaw which lies proximal to the fibers is provided with a recess in which a pad of soft resilient material is mounted. One jaw of the back jaws is provided in the jaw dividing plane with a recess in which the fibre ribbon is positioned so that the centers of the fibers lie in the jaw dividing plane. The other jaw is provided on that side thereof proximal to the ribbon with a recess in which a pad of soft resilient material is mounted. The pads project beyond the dividing plane of respective jaws and press against and firmly hold the fibre ribbon when the mould is closed.

4 Claims, 1 Drawing Sheet

MOLD ARRANGEMENT FOR OPTODEVICES

BACKGROUND

The present invention relates to a mould arrangement for moulding optodevices onto optical fibre ribbons, said mould comprising a plurality of plates which are intended to be inserted between the movable top plate and the stationary bottom plate, or counterpressure plate, of a transfer moulding press, and including an inlet channel, primary and secondary runners and an optodevice moulding cavity which is defined by two of said plates when brought together and through which the fibre ribbon extends.

It is known to mould optodevices or ferrules directly onto optical fibres by means of a so-called transfer moulding process. This process involves injecting moulding material, such as thermoplastic material or like material, into the mould cavity under high pressure. In this regard, it is essential that the fibre is positioned correctly in the mould. This normally presents no problem with regard to single optofibres having accurate tolerances, although problems do occur with optical fibre ribbons because of the large tolerances. There is therefore a danger that the fibres will be crushed in the tool when the fibre ribbon tolerance lies on a maximum value. In addition, fibre ribbons occur in different variants with different numbers of optical fibres, such as four, eight or twelve fibres. It is necessary to have access to a special tool for each type of ribbon or cable to be processed.

SUMMARY

The object of the present invention is to avoid the problem encountered with different cable or ribbon tolerances and with different types of ribbon or cable having different numbers of optical fibres, by providing a mould which is adapted to both minimum and maximum ribbon tolerances, without risk of the fibres being crushed or squeezed to pieces and which can be readily adapted for different types of ribbon. This object has been achieved by providing the mould with exchangeable jaws and with resilient pads.

The invention will now be described in more detail with reference to a preferred exemplifying embodiment thereof and also with reference to the accompanying drawings.

DETAILED DESCRIPTION

Figure 1A:
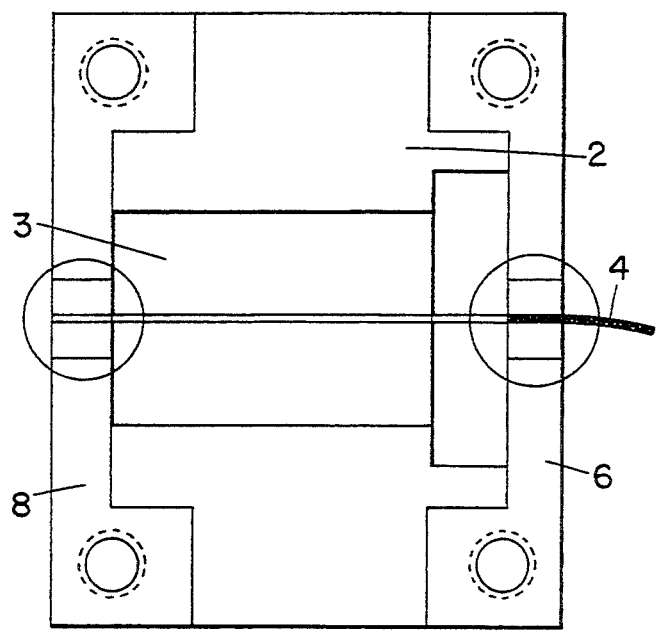
FIGS. 1a and 1b illustrate schematically an inventive mould from above and from one side.

The drawings illustrate schematically a mould for moulding an optodevice onto an optical fibre ribbon. Only those elements that are significant to the invention have been included in the drawings. For instance, those parts of the mould which include the necessary inlet channels, primary and secondary runners, etc., have not been shown. Furthermore, only one cavity has been shown, although in practice the mould will preferably include a plurality of mould cavities so that a plurality of optodevices can be moulded simultaneously onto a corresponding number of fibre ribbons.

Figure 1B:
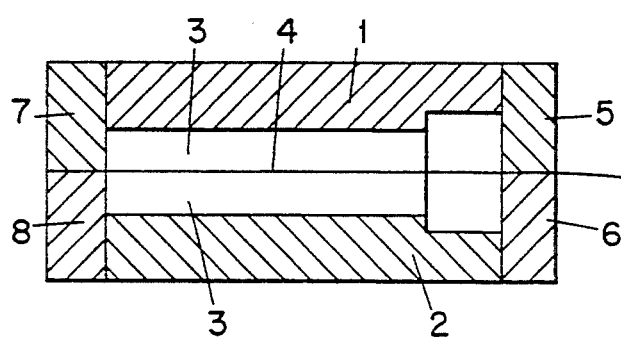

The mould is preferably a modified plate mould constructed from a number of plates, of which the two plates which together define the optodevice moulding cavity have been shown in FIG. 1b. The two mould plates of the illustrated embodiment are mutually identical and as illustrated in FIGS. 1a and 1b comprise respectively a top plate 1 and a bottom plate 2, each being provided with a mould cavity 3. The plates 1 and 2 are provided with exchangeable back jaws 5 and 6 and exchangeable front jaws 7 and 8, which function to hold a fibre ribbon 4 positioned centrally through the combined cavities 3 during a moulding operation. The jaws 5, 6 and 7, 8 are exchangeable so as to enable the mould to be adapted to different fibre ribbons 4 containing, for instance, four, eight or twelve fibres. The back jaws 5 and 6 are constructed to take-up and hold during the moulding operation the optical fibres from which protective covering material has been removed, whereas the front jaws 7 and 8 are constructed correspondingly to take-up and hold the fibre ribbon 4 on which the protective covering is intact.

Figure 2:
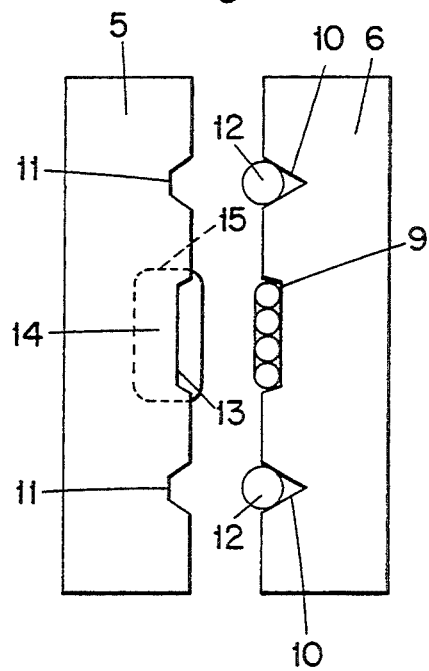
FIG. 2 is a detailed side view of part of exchangeable ribbon-securing rear jaws.

FIG. 2 is a detail view of part of the back jaws 5 and 6 taken from one side. The lower jaw 6 is provided in the jaw dividing plane, this plane coinciding with the dividing plane of the mould plates 1 and 2, with a recess 9 which extends transversely across the jaw and the width of which is adapted to the width of the fibre ribbon 4, i.e. to the number of optical fibres included in the ribbon. As illustrated, the edges of the recess are angled so as to be able to take-up different tolerances within one and the same type of fibre ribbon. The recess 9 is also adapted so that the centre of the optical fibres will lie in the dividing plane. The jaw 6 is provided with V-grooves 10 whereas the top jaw 5 is provided with trapezoidal grooves 11 corresponding to the grooves 10. Guide pins 12 are arranged in the grooves 10 and 11 for centering the jaws 5 and 6 and also the mould plates 1 and 2 relative to one another, and therewith to centre the fibre ribbon 4 in the mould cavity 3. The top plate 5 includes a recess 13 which corresponds to the recess 9 in the bottom jaw 6. The recess 13, however, has a depth which slightly exceeds half the thickness of the fibre ribbon, so as to prevent the fibres being crushed when the mould plates are brought together. To this end, a soft resilient pad 14, for instance made of VETON rubber is mounted in a corresponding recess 15 in the upper jaw 5, this pad functioning to hold the fibre ribbon 4 securely and also to compensate for variations in the thickness of the ribbon. The pad 14 projects out beyond the dividing plane and when the cavity defining plates are brought together presses gently against the fibre ribbon without damaging the same but while, at the same time, holding the ribbon securely on the mould tool.

Figures 3A, 3B:
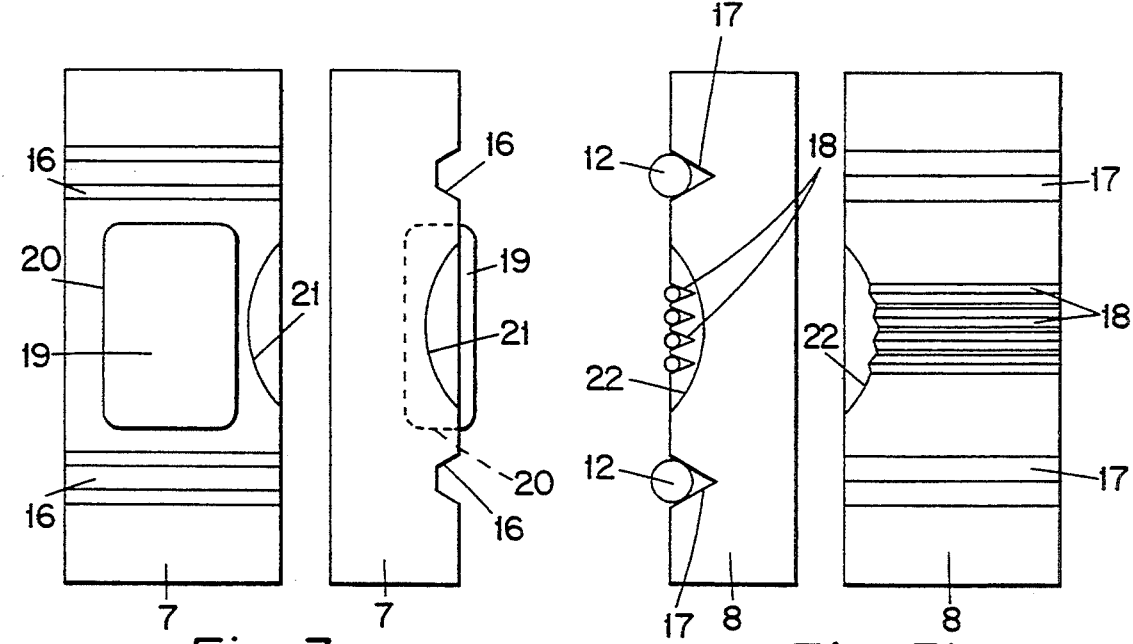
FIG. 3a is a detailed view of part of the exchangeable upper front jaw from above and from one side.
FIG. 3b is a detailed view of part of the exchangeable lower front jaw from above and from one side.

FIG. 3 is a part view of the front jaws, while FIG. 3a shows the upper jaw 7 from beneath and from one side respectively and FIG. 3b shows the lower jaw 8 from one side and from above respectively. These jaws 7 and 8 are also provided with a respective trapezoidal groove 16 and V-groove 17 in the dividing plane between the jaws, said grooves accommodating guide pins 12 which function to centre the jaws 7 and 8 in relation to one another. In this regard, the guide pins 12 are similar to the guide pins shown in FIG. 2 for the jaws 5 and 6 and extend through the mould cavity 3 when the cavity defining plates are brought together. Subsequent to moulding the optodevice, the guide pins 12 are removed from the device and the holes that are left in the device can be used to accommodate guide pins which centre the device, and therewith the optical fibres, relative to another device to which the first-mentioned device shall be connected.

For the purpose of positioning and holding the optical fibres in the ribbon from which coating material has been stripped, the lower jaw 8 is provided with a number of V-grooves 18 corresponding to the number of fibres in the ribbon, said fibres being centered in the grooves 18 so that their centres will lie in the dividing plane. As in the case of the upper back jaw 5, a pad 19 is mounted in a recess 20 in the upper front jaw 7 so as to hold the fibres securely without crushing the fibres. The pad 19 also projects beyond the dividing plane and is also made of a soft, resilient material, such as VETON rubber, for instance.

As shown in FIGS. 3a and 3b, the jaws 7 and 8 may also be provided with a respective recess 21 and 22. These recesses are provided in that side of respective jaws that lies proximal to the mould cavity 3 and are arranged to form a ridge around the fibres projecting from the device during a moulding operation. This ridge is ground down and polished off from the moulded device.

It will be understood that the illustrated and described mould and the exchangeable front and back jaws have only been given by way of example and that their design can be varied in many different ways.

It will also be understood that the invention is not restricted to the aforedescribed and illustrated exemplifying embodiment thereof and that modifications can be made within the scope of the following claims.

What is claimed is:

1. In a mold comprising a plurality of mold plates for insertion between a movable top plate and a stationary bottom plate of a transfer molding press, and including an inlet channel, primary and secondary runners, and an optodevice molding cavity defined by two of the plurality of mold plates when brought together and through which an optical fiber ribbon extends, an arrangement for molding an optodevice onto the optical fiber ribbon comprising, in each of the mold plates, respective front and back exchangeable jaws;

wherein a number of V-grooves corresponding to a number of fibers in the fiber ribbon is disposed in one of the front jaws in a jaw dividing plane, the optical fibers having been stripped of protective coveting and positioned in the V-grooves such that their centers lie in the jaw dividing plane;

a first recess is disposed in the other front jaw on a side thereof proximal to the fibers, in which first recess a first pad of soft resilient material is mounted;

one of the back jaws has a second recess in the jaw dividing plane in which the fiber ribbon is positioned;

a third recess is disposed in the other back jaw on a side thereof proximal to the ribbon, in which third recess a second pad of soft resilient material is mounted; and the pads project beyond the jaw dividing plane and press against and hold the fiber ribbon when the mold is closed.

2. The arrangement of claim 1, wherein the front and back jaws have, respectively, V-grooves and trapezoidal grooves which accommodate guide pins for positioning the jaws in relation to one another.

3. The arrangement of claim 1, wherein the resilient pads are made of rubber.

4. The arrangement of claim 1, wherein edges of the recesses in the back jaw are angled.

* * * * *